United States Patent [19]
Feigel et al.

[11] Patent Number: 5,609,399
[45] Date of Patent: Mar. 11, 1997

[54] HYDRAULIC BRAKING SYSTEM WITH SLIP CONTROL

[75] Inventors: Hans-Jorg Feigel, Rosbach; Ulrich Neumann, Rossdorf; Lothar Schiel, Hofheim, all of Germany

[73] Assignee: ITT Automotive Europe GmbH, Germany

[21] Appl. No.: 530,232

[22] PCT Filed: Mar. 22, 1994

[86] PCT No.: PCT/EP94/00885

§ 371 Date: Nov. 21, 1995

§ 102(e) Date: Nov. 21, 1995

[87] PCT Pub. No.: WO94/22699

PCT Pub. Date: Oct. 13, 1994

[30] Foreign Application Priority Data

Mar. 27, 1993 [DE] Germany ............................ 43 10 061.9

[51] Int. Cl.$^6$ .................. B60T 8/32; B60T 8/44; B60T 8/48
[52] U.S. Cl. .................. 303/113.4; 188/162; 303/114.1; 303/115.2; 303/113.2; 303/116.1
[58] Field of Search .................. 303/113.4, 115.2, 303/162, 115.1, 113.2, 113.3, 114.1, 114.2, 116.1, 13–15, 125, 135, 155; 60/545; 91/369.1, 376 R; 188/358–359, 162, 106 P, 156, 158

[56] References Cited

U.S. PATENT DOCUMENTS

| | | | |
|---|---|---|---|
| 4,327,414 | 4/1982 | Klein | 188/156 |
| 4,776,646 | 10/1988 | Siegel | 303/114.1 |
| 4,838,622 | 6/1989 | Kircher et al. | 303/113.2 |
| 4,919,493 | 4/1990 | Leiber | 303/113.4 |
| 4,950,028 | 8/1990 | Harrison | 303/115.2 |
| 5,098,171 | 3/1992 | Siegel | 303/113.4 |
| 5,115,186 | 5/1992 | Reinhartz et al. | |
| 5,123,717 | 6/1992 | Willmann | 303/113.4 |
| 5,161,865 | 11/1992 | Higashimata | |
| 5,188,436 | 2/1993 | Devall | 303/115.2 |
| 5,302,008 | 4/1994 | Miyake et al. | 303/113.4 |

FOREIGN PATENT DOCUMENTS

| | | |
|---|---|---|
| 0374485 | 6/1990 | European Pat. Off. . |
| 0379329 | 7/1990 | European Pat. Off. . |
| 0411320 | 2/1991 | European Pat. Off. . |
| 0422457 | 4/1991 | European Pat. Off. . |
| 2646505 | 11/1990 | France . |
| 3240404 | 5/1984 | Germany . |
| 3511579 | 10/1986 | Germany . |
| 3731603 | 5/1988 | Germany . |
| 3844068 | 8/1990 | Germany . |
| 3928109 | 2/1991 | Germany . |
| 4003957 | 8/1991 | Germany . |
| 4020449 | 1/1992 | Germany . |
| 4021699 | 1/1992 | Germany ............................ 303/113.4 |
| 4102497 | 5/1992 | Germany . |
| 2129890 | 5/1984 | United Kingdom . |
| 2174161 | 10/1986 | United Kingdom ................ 303/114.1 |

OTHER PUBLICATIONS

Search Report from the German Patent Office for Application No. P4310061.9.

Primary Examiner—Douglas C. Butler
Attorney, Agent, or Firm—Thomas M. Twomey; J. Gordon Lewis

[57] ABSTRACT

A hydraulic braking system with slip control, comprising a working piston guided within the brake pressure generator, a booster piston of a hydraulic brake force booster for actuating the working piston at least one wheel brake connected to the brake pressure generator and an electrically excitable auxiliary pressure source adapted to be connected to the brake force booster, a control and regulating electronic unit for detecting the wheel rotating pattern and for controlling the wheel braking pressure by pressure modulating valves. An electronic sensor is provided for detecting the relative movement between the pressure rod and the booster piston, the output signals of which are capable to influence the excitation of the auxiliary pressure source. This will permit the brake force boosting, if need be, to be effected independently of actuation forces put in manually, with anti-locking control/traction slip control functions being readily exercisable at any time.

9 Claims, 1 Drawing Sheet

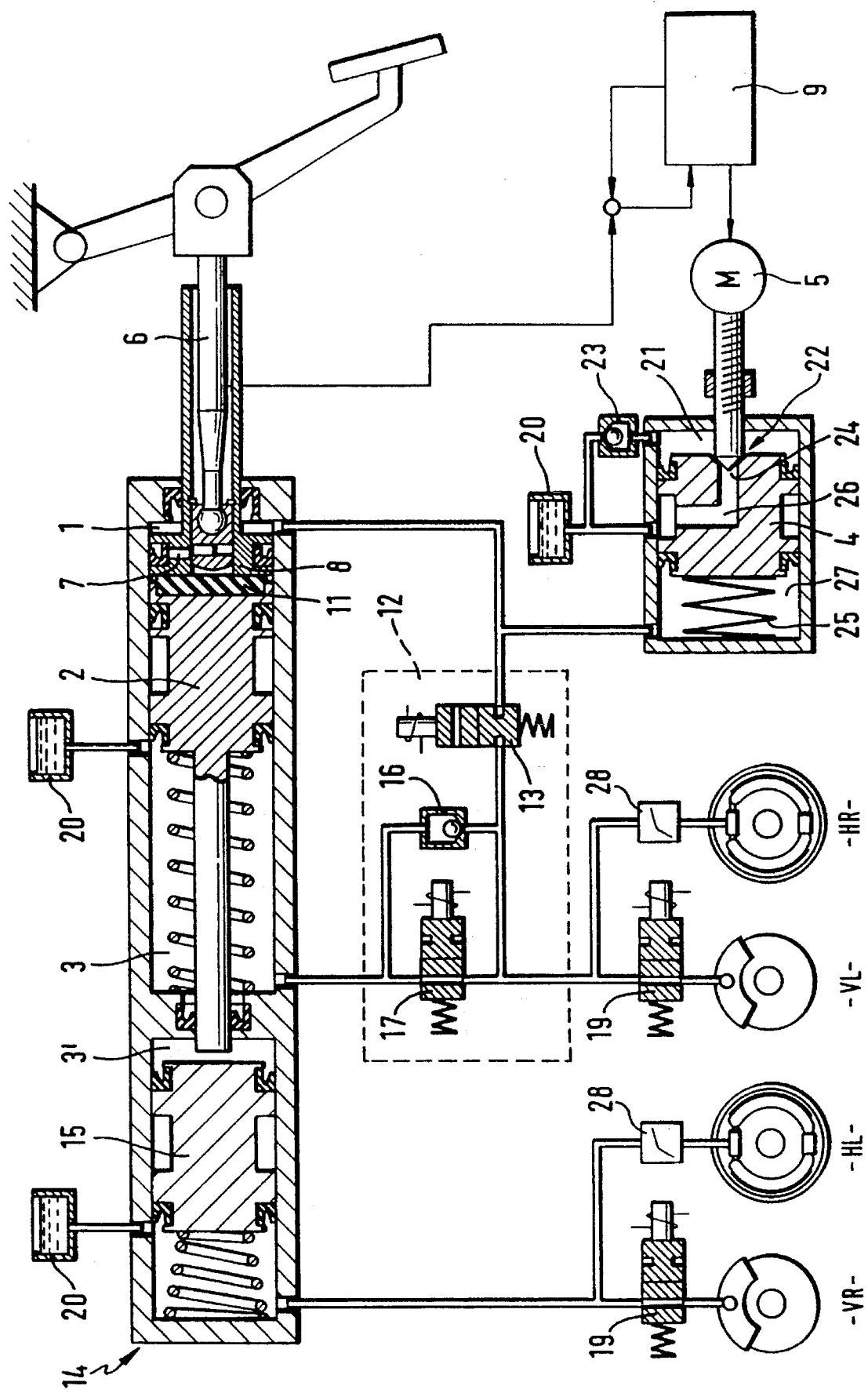

HYDRAULIC BRAKING SYSTEM WITH SLIP CONTROL

TECHNICAL FIELD

The present invention is concerned with a hydraulic braking system with slip control.

BACKGROUND OF THE INVENTION

DE 32 40 404 A1 discloses a braking system with slip control for automotive vehicles which comprises a brake force booster coupled to the tandem master cylinder. Located between the tandem master cylinder and the hydraulic brake force booster, within the housing of the brake pressure generator, is a positioning piston to which pressure from an external energy source is dynamically applied during the brake slip control through a corresponding valve and switching arrangement. In order to allow the manually controlled actuating force, the pressure rod and, hence, the use of the brake pedal is possible at any time during the slip control mode.

In the generic braking system according to EP-A-0374485 the master brake cylinder formed as an electrohydraulic follower booster is connected through a piston rod to a braking pedal. The piston rod applies pressure to a master cylinder piston through which, in turn, a braking chamber can be pressurized. The brake fluid is passed through brake conduits to the corresponding wheel brake cylinder. Associated to the master cylinder piston is a servo piston chamber which, through magnetic valves, is connected to a pressure fluid accumulator and a pump delivering into the pressure fluid accumulator. Moreover, a pressure limiting valve is provided in the bypass leading to the pump so that an auxiliary pressure source formed of the magnetic valves, the accumulator, a check valve and the pressure limiting valve with the pump delivers the pressure fluid of an intake reservoir in communication with the brake pressure generator either to the servo piston chamber or back to the intake reservoir. The magnetic valves of the auxiliary pressure source are controlled through a sensor detecting the movement of the piston rod. Moreover, a sensor is also associated to the master cylinder piston, detecting independently of the movement of the piston rod the actual movement of the master cylinder piston and also enabling the magnetic valves for the control of the auxiliary pressure source to be actuated by means of an electronic assembly. The switching and mechanical efforts required for providing the auxiliary pressure in the brake pressure generator are disadvantageous. Defective magnetic valves of the auxiliary pressure source result in a failure of the servo pressure for the brake pressure generator.

The switching principle of the braking system for controlling the brake slip is to be improved with a view to the multiplicity of required inlet and outlet valves. In special operating modes of the braking system, the expansion of the pressure fluid will have to take place in the non-pressurized intake reservoir which is likely to result in operating failure. In addition, the structural design of the brake pressure generator does not permit a servo force control characteristic that can be performed independently of the manual input force to allow, if need be, a simple change in the brake characteristic. Also, the use of a relatively complex auxiliary pressure generator (motor pump aggregate) proves to be cost-intensive.

It is, therefore, the object of the invention to provide a braking system with slip control in which the afore-mentioned disadvantages have been overcome, permitting versatile use through a simple, low-cost and safe design, which can be extended to multi-channel operation involving low energy consumption. Another object of the invention resides in enabling the brake force booster function to be varied within predetermined limits independently of the pressure rod actuation.

These objects are achieved providing an electronic sensor means for detecting the relative movement between the pressure rod and the booster piston, the output signals of which are able to influence the excitation of the auxiliary pressure source. Hence, the brake force boosting is effected, if need be, independently of actuating forces put in manually, thereby enabling at any time by simple means an anti-locking control/traction slip control function.

BRIEF DESCRIPTION OF THE DRAWINGS

FIG. 1 schematically shows one form of embodiment of the invention.

DETAILED DESCRIPTION OF THE PREFERRED EMBODIMENTS

The braking system is designed with a diagonal brake circuit division. The housing of the brake pressure generator 14 comprises two working pistons 2,15 in tandem arrangement which are actuable by means of a pressure rod 6 guided within a booster piston 8. A first working piston 2 facing the booster piston 8 and the pressure rod 6 is arranged within a first pressure chamber of the brake pressure generator 14, with the first pressure chamber being subdivided into a chamber 3' and a booster chamber 1 accommodating the booster piston 8.

The two chambers 1,3 can be connected by means of a valve arrangement and, hence, a hydraulic switching arrangement 12 to another chamber 3' in which is inserted another working piston. Moreover, coupled to the said switching arrangement 12 is an auxiliary pressure source formed of a servo drive 5 and a floating piston 4. The pressure rod 6 is guided within a sleeve-type piston section of the booster piston 8. The booster piston 8 includes sealants both on the sleeve-type piston section and on the expanded booster piston so as to insure leakage-free sealing of the booster chamber 1. The brake pressure input to the effect of a reaction delaying characteristic improving the feeling for a manual actuation is performed through a rubber reaction disk 11 embedded between the booster piston 8 and the working piston 2.

The pressure rod actuation is detected by a sensor means 7, for example, by means a Hall-type sensor and a permanent magnet through electronic processing of the output signals of the sensor in the control and regulating electronic arrangement 9, with the requirement of a separate electronic arrangement being eliminated once the processing of the output signals is effected within the control and regulating electronic arrangement 9 provided for the ALC/TSC braking operation.

The positioning sensor of the sensor means 7 according to the example of embodiment is located in the area between the booster piston 8 and the pressure rod 6. The signal of movement detected by the positioning sensor is evaluated by the peripherally arranged control and regulating electronic unit 9 which in case of a control deviation will activate the floating piston 4. With a view to the reliability and safety of the brake system the control and regulating electronic arrangement 9 and the sensor means 7 preferably are of a redundant design. Not only does the electronic unit perform the control and regulation of the brake force booster function but as a result of the suggested hydraulic switching arrangement 12 can, in case of need, equally perform the anti-locking control and traction slip control functions. It is suggested to employ in place of a multiplicity of driving means an electric rotary drive designed as a spindle drive serving as the servo drive 5 for the floating piston 4, which rotary drive is of a non-self-inhibiting design to safeguard a smooth restoring movement of the floating piston 4. The said servo drive 5 is characterized by a high efficiency degree and by a compact and light design. However, if desired or required, vacuum, compressed air and hydraulic drives can be used by way of alternative. Pneumatic linear drives having electrically actuable and electric drives have proved to be particularly suitable. To keep the thermal and electric energetic load on the servo drive 5 as low as possible, a locking means is provided for maintaining a holding force, in respect of which a liquid-filled, lockable pressure chamber 21 is particularly suitable. The pressure chamber 21 is provided immediately behind the floating piston 4 and can be connected to the intake reservoir 20 through a check valve 23 and through a closure member 24 provided on the servo drive 5 and acting upon the floating piston 4. The servo drive 5 has a reversal of the direction of rotation in order to establish, if need be, the pressure fluid communication between the pressure chamber 21 and the intake reservoir 20 through a passageway within the floating piston 4.

According to another embodiment of the principle according to the invention a sensor is provided for measuring the position of the floating piston or spindle. Moreover, by using a sensor for detecting the pivot angle of the electric rotary motor the pressure prevailing in the braking system can be concluded from the actuating characteristic of the servo drive which favors the brake pressure control. Also a sensor for detecting the electric power taken up by the servo drive 5 could be suitably used for this purpose.

The way of operation of the braking system according to the invention will now be described in closer detail. All elements shown in FIG. 1 are associated with the brake releasing position. The standard braking function is performed in a known per se manner by manually actuating the pressure rod 6. The movement of the pressure rod 6 is detected by the sensor means 7 and is monitored within the control and regulating electronic unit 9 on the basis of the nominal data. Below the permitted wheel slip threshold the blocking and inlet valves 13, 17 contained in the hydraulic switching arrangement remain electrically de-energized, with the servo drive 5 and the floating piston 4 being activated in case of a control deviation from the nominal data of the desired booster characteristic. With the servo drive inactivated, first a mechanical through-drive is provided according to a conventional braking system. As a result of the sensor signal evaluation in the control and regulating electronic unit 9, the hydraulic booster function is electrohydraulically varied, according to the requirements, through the variable for the servo drive 5. To that extent, the pressure fluid volume directly fed into the booster chamber 1 by the floating piston 4 has the desired booster pressure. Reducing the booster pressure is effected by a reversal process of the servo drive 5, thereby pressure-relieving the floating piston 4. In the preferred form of embodiment, this is effected by a reversal of the direction of rotation of the spindle motor, thereby causing the conical closure member 24 acting on the spindle drive as a shut-off valve 22 to reduce the holding force respectively effective in the pressure chamber 21 by the pressure fluid flowing back to the intake reservoir 20 through a passage 26 provided in the floating piston 4. The floating piston 4 under the action of spring 25 can thus move backward resulting in enhanced volume take-up in the modulator chamber 27.

Once the control and regulating electronic arrangement 9 identifies excessively high brake slip values in the operating brake position by means of additional sensors for detecting the wheel speed, the brake pressure modulation (anti-locking control mode) characterized by pressure maintaining, pressure decreasing and pressure increasing phases is activated. For filtering out disturbance variables and for generating the pressure maintaining function in both brake circuit diagonals, the normally open inlet valve 17 is electromagnetically closed, thereby causing the pressure fluid volume enclosed in chamber 3 to hydraulically block the pressure rod 6 and, hence, to limit the manual brake force actuation put in. During that time, the shut-off valve 13 and the floating piston 4 remain unaffected by this measure in the inactive position as shown.

For initiating the pressure decreasing phase, with the inlet valve 17 still closed, the shut-off valve 13 opens the hydraulic connection of the brake circuit normally in communication with the chambers 3,3' toward the booster chamber 1 and the floating piston 4. By pressure-relieving the chamber 3' the working piston 15 is at the same time pressure-relieved so that also in the connected brake circuit the pressure toward the intake reservoir 20 provided on the brake pressure generator can be reduced. The hydraulic pressure of the other brake circuit directly connected to the switching arrangement 12 escapes during the pressure decreasing phase into the expanded modulator chamber 27. This pressure reduction is caused as a result of the reversal process initiated by the servo drive 5, wherein the closure member 24 on the spindle drive causes the pressure fluid to flow back from the pressure chamber 21 through the passageway 26 to the intake reservoir 20. The actuating force (pedal force) manually fed through the pressure rod 6 to the working piston 2 is ineffective due to the blocking position of the inlet valve 17 and, hence due to the blocking of chamber 3.

The wheel-specific control of the brake pressure pattern within the front wheel brakes VR, VL is by electromagnetically actuable 2-way/2-position valves 19 open in de-energized condition. These valves, during the pressure maintaining phase, are electromagnetically switched to the blocking position and, during the pressure increasing and pressure decreasing phases, are in the electromagnetically de-energized open basic position. The brake pressure of the rear wheel brakes HL, HR, in the present instance are predetermined within the range of permitted slip values through the fixed output characteristic of two conventional brake force controls 28, whereas in the anti-locking control mode the pressure pattern in the rear wheel brakes is dependent on the way of operation of the inlet valve 17 and of the shut-off valve 13 as well as on the activation of the floating piston 4. In respect of the rear axle brakes HL, HR it is to be concluded that in the pressure decreasing phase both rear wheel brakes by closing the inlet valve 17 (working piston2, booster piston 1 are hydraulically blocked) and by opening the shut-off valve 13, the same are pressure-relieved as soon as the floating piston 4 performs a reset movement. Pressure fluid is drawn off directly from the booster chamber 1, chamber 3' of the working cylinder 15 and from the rear wheel brake HR of the brake circuit of the pressure rod.

For realizing the pressure increasing phase in the two rear wheel brakes, the pressure fluid volume displaced from the modulator chamber 27 by the floating piston 4, through the open shut-off valve 13 is fed both into the pressure rod brake circuit and into the chamber 3' required for the hydraulic actuation of the other working piston 15. Upon completion of the manually input brake actuating phase, the switching modes of the inlet and outlet valves 17, 12 again reverse so that the valves are restored to their original basic position.

For safety reasons, a check valve 16 opening toward the chamber 3 in arranged in parallel to the inlet valve 17 in order to enable, in all circumstances, a manually controlled pressure relief of the wheel brakes to be effected if the inlet valve 17 is jammed in the blocking position.

The switching arrangement of the brake system according to the invention as shown in FIG. 1 not only is suitable for performing a brake force booster function adaptive to the characteristic field and for use as a brake slip control but is also suitable for controlling the traction slip in that the brake actuating pressure prevailing in the wheel brakes of the driven vehicle wheels can be determined, without any special efforts, by electronically actuating the servo drive 5 once additional electromagnetically operable shut-off valves are provided in the branches of the brake conduit of the non-driven vehicle wheels (not expressly shown in FIG. 1). Consequently, in the traction slip control mode pressure is hydraulically applied to the working piston 2 and the booster piston 8 by activating the servo drive 5. The inlet valve 17 remains opened while the shut-off valve 13 remains closed. Pressure fluid from the modulator chamber 27 is exclusively passed into the booster chamber 1 so that the pressure required for the traction slip control can act upon the two working pistons 2,15 and, hence, on the wheel brakes of the driven vehicle wheels while the wheel brakes of the non-driven vehicle wheels are separated from the pressure control by preferably electromagnetically operable way-valves.

We claim:

1. A hydraulic braking system with slip control, for automotive vehicles, comprising:
    at least one working piston guided in a brake pressure generator, a booster piston of a hydraulic brake force booster for actuating the working piston,
    at least one wheel brake connected to the brake pressure generator and an electrically actuable auxiliary pressure source connected to the booster piston,
    a control and regulator electronic assembly for detecting the wheel rotating pattern of a wheel attached to said at least one brake and for controlling the wheel brake pressure by means of pressure modulating valves,
    an electronic sensor means for detecting the relative movement between a pressure rod attached to the brake pressure generator and the booster piston, the output signals of which are input to the control and regulator electronic assembly, wherein the electrically actuable auxiliary pressure source is formed of a floating piston and a servo drive, wherein the auxiliary pressure source is provided with a locking means for maintaining a holding force, wherein the locking means includes a fluid-filled, blockable pressure chamber the internal pressure of which generates the required holding force, wherein the locking means establishes a first hydraulic connection between the pressure chamber and an intake reservoir in which said first connection is inserted a check valve opening toward the pressure chamber and a second hydraulic connection established between the pressure chamber and the intake reservoir by means of an electrically actuable shut-off valve.

2. A hydraulic braking system according to claim 1, wherein the processing of the output signal of the electronic sensor means takes place in the control and regulator electronic assembly.

3. A hydraulic braking system according to claim 1, wherein the electronic sensor means is located on the pressure rod and is guided relative to the brake pressure generator.

4. A hydraulic braking system according to claim 1, wherein the electronic sensor means is formed of a Hall-type sensor and a permanent magnet.

5. A hydraulic braking system according to claim 1, wherein the fluid-filled pressure chamber on the front side of the floating piston facing away from the modulator chamber is arranged directly behind the floating piston.

6. A hydraulic braking system according to claim 5, wherein the servo drive is formed of an electric rotary drive with a spindle drive.

7. A hydraulic braking system according to claim 1, wherein the shut-off valve is arranged in the area of the force transmission of the servo drive on the floating piston, and that a closure member of the shut-off valve is connected to the servo drive, and that the valve seat of the closure member on the front side, in the floating piston, confines a passageway in communication with the intake reservoir.

8. A hydraulic braking system according to claim 7, wherein the servo drive contains a back-stroke control effective through a reversal of the direction of rotation of the servo drive against the action of a spring.

9. A hydraulic braking system according to claim 1, wherein a rubber reaction disk is arranged between the booster piston and a working piston.

\* \* \* \* \*